(12) United States Patent
Hao et al.

(10) Patent No.: US 10,473,081 B1
(45) Date of Patent: Nov. 12, 2019

(54) POWERTRAIN WITH AC BRUSHLESS STARTER AND SENSOR/SENSORLESS CONTROL METHOD

(71) Applicant: GM Global Technology Operations LLC, Detroit, MI (US)

(72) Inventors: Lei Hao, Troy, MI (US); Suresh Gopalakrishnan, Troy, MI (US); Chandra S. Namuduri, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 50 days.

(21) Appl. No.: 15/961,094

(22) Filed: Apr. 24, 2018

(51) Int. Cl.
*F02N 11/08* (2006.01)
*H02P 6/08* (2016.01)
*H02P 6/16* (2016.01)

(52) U.S. Cl.
CPC ............... *F02N 11/08* (2013.01); *H02P 6/08* (2013.01); *H02P 6/16* (2013.01); *F02N 2200/04* (2013.01); *F02N 2300/102* (2013.01); *F02N 2300/104* (2013.01)

(58) Field of Classification Search
CPC .......... F02N 11/08; F02N 2200/04; F02N 2300/102; F02N 2300/104; H02P 6/08; H02P 6/16
USPC .............. 123/179.3, 179.4, 179.25; 701/113; 73/114.58, 114.59
See application file for complete search history.

(56) References Cited

U.S. PATENT DOCUMENTS 7,443,044 B2 * 10/2008 Shimazaki ............. F02N 11/00
290/38 R 9,614,397 B2 * 4/2017 Sonoda ................. H02J 7/1484

FOREIGN PATENT DOCUMENTS

| CN | 2711983 Y | 7/2005 |
|----|-----------|--------|
| EP | 0619427 B1 | 10/1994 |
| JP | 2000104650 A | 4/2000 |

OTHER PUBLICATIONS

Quanbao Zhou, John Houldcroft, "Cold engine cranking torque requirement analysis," SAE International Inc., 2007, JSAE 20077002.
Hao et al, U.S. Appl. No. 15/961,128, filed Apr. 24, 2018.
Namuduri et al, U.S. Appl. No. 15/967,918, filed May 1, 2018.
Namuduri et al, U.S. Appl. No. 15/967,915, filed May 1, 2018.
Hao et al, U.S. Appl. No. 15/967,910, filed May 1, 2018.

* cited by examiner

*Primary Examiner* — Hai H Huynh
(74) *Attorney, Agent, or Firm* — Quinn IP Law

(57) ABSTRACT

An electric starter system includes a brushless alternating current (AC) starter motor selectively coupled to an engine and having a rotor with a rotor position. A position sensor generates measured position signals indicative of rotor position. A controller is in communication with the sensor. The controller has sensorless logic, e.g., a BEMF, inductance, or high-frequency signal injection method, for generating an estimated rotor position. The controller executes a method in which, below a threshold speed of the starter motor, the controller calibrates the sensorless logic using the measured position signals and controls a torque operation of the starter motor using the measured position signals. Above the threshold speed, the torque operation is controlled solely using the estimated rotor position. A powertrain includes the engine, a transmission, a drive shaft, and a load, along with the electric starter system.

20 Claims, 2 Drawing Sheets

POWERTRAIN WITH AC BRUSHLESS STARTER AND SENSOR/SENSORLESS CONTROL METHOD

INTRODUCTION

A powertrain may include an internal combustion engine that generates engine torque in response to an acceleration request. The generated engine torque is transmitted to a coupled load via a transmission, e.g., a planetary gear arrangement or a gearbox. In some powertrain configurations, a rotor of an electric machine is selectively coupled to the engine, with motor torque from the electric machine used to accelerate the engine to a threshold speed. Such torque assist may be limited to supporting the engine's cranking and starting function, with the electric machine in such an application referred to as a starter motor. Alternatively, torque pulses from the electric machine may be used when the engine is already running, for instance to temporarily boost engine torque and/or to reduce driveline noise, vibration, and harshness.

SUMMARY

An electric starter system is disclosed herein for use with an internal combustion engine. The starter system includes an alternating current (AC) brushless starter motor having a rotor coupled to the engine, one or more position sensors, and a controller. Control of the starter motor requires accurate knowledge of the rotor's angular position and speed. To this end, the controller is configured to execute a hybrid sensor/sensorless control methodology as described below in controlling a torque operation of the starter motor.

In particular, the controller as described herein is configured to control the torque operation of the starter motor, i.e., generation and delivery of motor torque to the engine, at motor speeds below a calibrated threshold speed, such as about 1000 RPM. The controller performs this task using measured angular position signals from the position sensor(s). Below the threshold speed, the controller uses the measured angular position signals to calibrate sensorless logic residing in memory of the controller. Above the threshold speed, the controller estimates the rotor's angular position using the sensorless logic alone, i.e., the controller does not rely on the measured angular position signals when operating above the threshold speed. The combined use of measured angular position signals from the position sensor(s) at low speeds of the starter motor with the exclusive use of a sensorless logic-based estimated angular position at higher speeds, i.e., the above-noted "hybrid sensor-based/sensorless" approach, is intended to achieve a desired power level and improved flux-weakening control of the starter motor relative to existing methodologies.

Various embodiments exist for the position sensors. For instance, the position sensors may be optionally embodied as multiplying rotary encoders, digital or analog Hall-effect sensors, inductive sensors, reluctance sensors, or other incremental position sensors as described herein.

Upon starting the engine and while the starter motor rotates at speeds up to the threshold speed noted above, the angular position of the rotor is measured in real-time by the controller, for example using rising and falling edges of the angular position signals and a time interval between such edges for a Hall-effect sensor. The sensorless logic is then used to estimate the rotor's angular position, and an associated rotational speed, at starter motor speeds above the threshold speed, with the sensorless logic possibly such techniques as back-electromotive force (BEMF), inductance, or high-frequency signal injection in various non-limiting embodiments. Measured angular position of the rotor from the position sensors is used by the controller to calibrate and tune parameters of the sensorless logic when the starter motor operates below the threshold speed. The controller automatically transitions to the sensorless logic alone once position and speed estimation by the sensorless logic is stable and calibrated.

In an example embodiment, a powertrain may include the engine, a transmission coupled to the engine, the electric starter system, and the controller.

A hybrid sensor/sensorless control method is also disclosed for use with an engine. According to an example embodiment, the method includes, when the starter motor is operating below a threshold speed, generating measured angular position signals using the position sensor(s), with the measured angular position signals being indicative of the rotor position of the starter motor. The method further includes, when operating below the threshold speed, calibrating sensorless logic of the controller using the measured angular position signals, and then controlling a torque operation the starter motor using the measured angular position signals. The method further includes, when operating above the threshold speed, generating an estimated rotor position/rotor angle using the sensorless logic and controlling the torque operation of the starter motor solely using the estimated rotor position.

The above summary is not intended to represent every embodiment or aspect of the present disclosure. Rather, the foregoing summary exemplifies certain novel aspects and features as set forth herein. The above noted and other features and advantages of the present disclosure will be readily apparent from the following detailed description of representative embodiments and modes for carrying out the present disclosure when taken in connection with the accompanying drawings and the appended claims.

Figure 1:
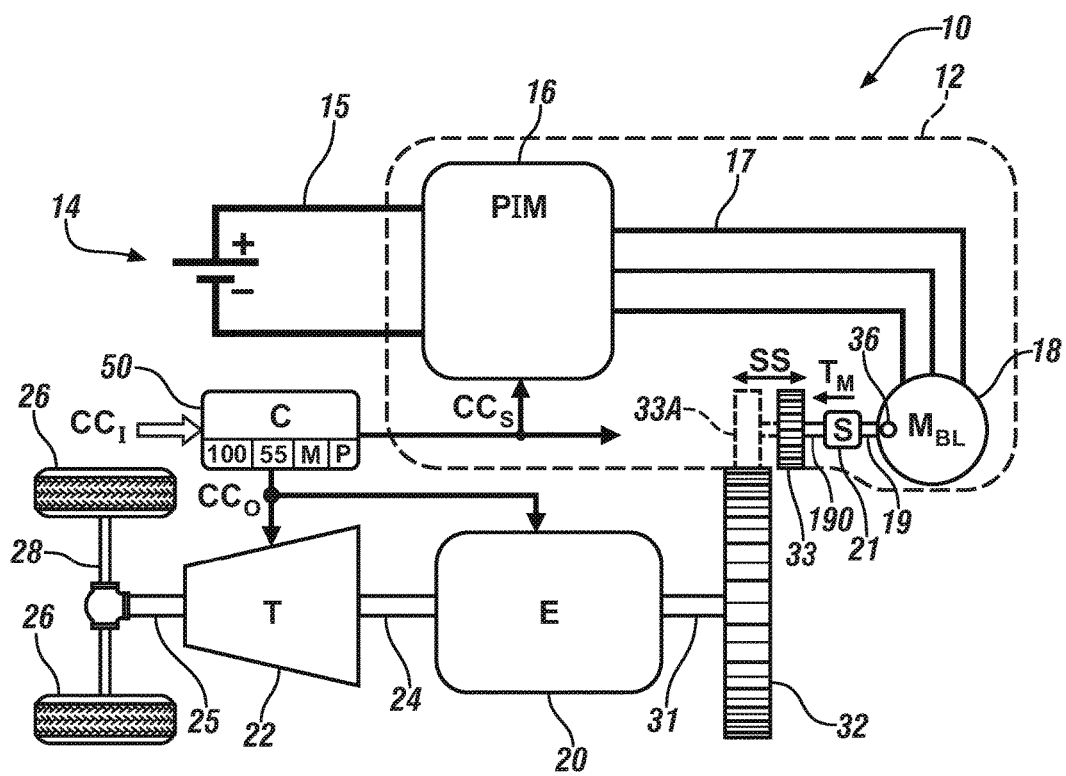
FIG. 1 is a schematic illustration of an example powertrain having a polyphase/AC brushless starter motor controlled via a hybrid sensor/sensorless control approach as set forth herein.

The present disclosure is susceptible to modifications and alternative forms, with representative embodiments shown by way of example in the drawings and described in detail below. Inventive aspects of this disclosure are not limited to the particular forms disclosed. Rather, the present disclosure is intended to cover modifications, equivalents, combinations, and alternatives falling within the scope of the disclosure as defined by the appended claims.

DETAILED DESCRIPTION

Embodiments of the present disclosure are described herein. The various embodiments are examples of the present disclosure, with other embodiments in alternative forms being conceivable by one of ordinary skill in the art in view of the disclosure. The figures are not necessarily to scale. Some features could be exaggerated or minimized to show details of particular components. Therefore, specific structural and functional details disclosed herein are not to be interpreted as limiting, but rather as a representative basis for teaching one skilled in the art to variously employ the present disclosure. As those of ordinary skill in the art will also understand, features illustrated and described with reference to one of the figures can be combined with features illustrated in one or more other figures to produce embodiments that are not explicitly illustrated or described. The combinations of features illustrated thus serve as representative embodiments for typical applications. Various combinations and modifications of the features consistent with the teachings of this disclosure, however, could be desired for particular applications or implementations.

Referring to the drawings, wherein like reference numbers refer to the same or like components in the several Figures, an example powertrain 10 is shown schematically in FIG. 1. The powertrain 10 includes an electric starter system 12 that is selectively connectable to an internal combustion engine (E) 20. The engine 20, e.g., a gasoline or diesel engine, ultimately outputs engine torque to an output shaft 24. The output shaft 24 is coupled to a transmission (T) 22, which in turn delivers output torque to a transmission output member 25. The output member 25 in turn drives a coupled load via one or more drive axles 28, with the load depicted in FIG. 1 as a set of drive wheels 26 in an example automotive application. Other applications may be envisioned, including power plants, robotics, mobile platforms, and non-motor vehicle applications such as watercraft, marine vessels, rail vehicles, and aircraft, and therefore the motor vehicle embodiment of FIG. 1 is intended to be illustrative of the disclosed concepts without limitation.

The engine 20 includes a crankshaft 31 coupled to a flywheel 32. When the engine 20 is not running, e.g., after a fuel-conserving autostop event of the engine 20 at idle or when cruising with the engine 20 turned off, the electric starter system 12 may be energized via a controller (C) 50 so as to deliver motor torque (arrow $T_M$) to the flywheel 32, with the controller 50 being part of the electric starter system 12 in some embodiments or a separate control device. One possible configuration for achieving such ends is the use of a solenoid (S) 21. The solenoid 21 may be disposed between a rotor 19 of a brushless alternating current (AC) electric machine ($M_{BL}$) 18, hereinafter referred to as the starter motor 18, and a shaft extension 19O, possibly with a gear reduction set (not shown) located between the rotor 19 and the solenoid 21.

When the solenoid 21 is energized via starter control signals (arrow $CC_S$) from the controller 50, the solenoid 21 linearly translates a pinion gear 33 to the position indicated at 33A, and thus into direct meshed engagement with the flywheel 32 and/or a gear element connected thereto. Once the engine 20 has started and its internal combustion process sustains a fueling process, the starter control signals (arrow $CC_S$) are discontinued and, as a result, the solenoid 21 is de-energized. The pinion gear 33 is urged out of engagement with the flywheel 32, e.g., via a return action of the solenoid 21. Such bi-directional translation capability of the pinion gear 33 is represented in FIG. 1 by double-headed arrow SS.

The example electric starter system 12 of FIG. 1 may include or may be connected to a direct current (DC) battery pack 14, e.g., a multi-cell lithium ion, nickel metal hydride, or lead acid battery pack having positive (+) and negative (−) terminals. The electric starter system 12 may include a power inverter module (PIM) 16 that is electrically connected across the positive (+) and negative (−) terminals of the battery pack 14 via a DC voltage bus 15, e.g., a 12-48 nominal VDC bus in a possible embodiment, as well as to a polyphase/alternating current (AC) voltage bus 17. Although omitted from FIG. 1 for illustrative simplicity, the PIM 16, as will be appreciated by one of ordinary skill in the art, includes upper and lower semiconductor switching pairs, e.g., IGBTs or MOSFETs respectively connected to positive (+) and negative (−) terminals via the DC voltage bus 15, and signal filtering circuit components which ultimately convert DC power from the battery pack 14 into polyphase power on the AC voltage bus 17.

In turn, the AC voltage bus 17 is electrically connected to individual phase windings (not shown) of the starter motor 18. The starter motor 18 may be variously configured as a surface permanent magnet machine, an internal permanent magnet machine, a drag-cup or cage induction machine, a switched reluctance machine, or another type of brushless motor without limitation. As recognized herein, brushless motors such as the starter motor 18 may enjoy an extended operating life with an improved level of speed control precision relative to certain brush-type motors, among other possible benefits. A field weakening control strategy may be employed to further improve control of the power output of the starter motor 18, with such a strategy benefiting from the hybrid sensor/sensorless approach disclosed herein with reference to FIGS. 2 and 3.

Because the starter motor 18 of FIG. 1 is an AC machine as noted above, the controller 50 requires accurate position data to ensure precise torque control of the starter motor 18, particularly during a starting function of the engine 20. Thus, at least one position sensor 36 is positioned with respect to the rotor 19, e.g., a shaft, hub, or other rotating portion of the starter motor 18 as shown schematically in FIG. 1. The position sensor 36 measures the angular position of the rotor 19 and reports the measured angular position to the controller 50 as part of a set of input signals (arrow $CC_I$). The number of position sensors 36 may vary depending on the application, with as few as one such position sensor 36 usable in some embodiments.

With respect to the position sensor(s) 36, as will be appreciated by one of ordinary skill in the art, a raw angular position sensor is either incremental or absolute, with a position signal from an absolute position sensor being proportion to true position regardless of whether the rotor 19 is stationary or moving. In contrast, an incremental position sensor detects positional changes. The finer the resolution of a given position sensor, the greater its cost. Thus, the cost of a given position sensor can vary dramatically based on whether the position sensor is absolute or incremental, and based on the sensing technology that is used. In some embodiments, therefore, the position sensor(s) 36 are incremental sensors.

Within the scope of the present disclosure, a suitable position sensor 36 for use in the present application is the multiplying encoder or digital Hall sensors, e.g., using polymer-bonded, multi-pole magnets, and in which encoder/Hall pulses and commutation pulses are generated as signal outputs. Another low-cost sensor usable as the position sensor(s) 36 of FIG. 1 is an analog Hall-effect sensor, e.g., one using neodymium magnets, or other field-based sensors operable for generating sine and cosine signals as sensor outputs. Other sensor types generating similar sine and cosine outputs are inductive-type and reluctance-type position sensors, both of which forego the use of magnets in their operation.

Figure 3:
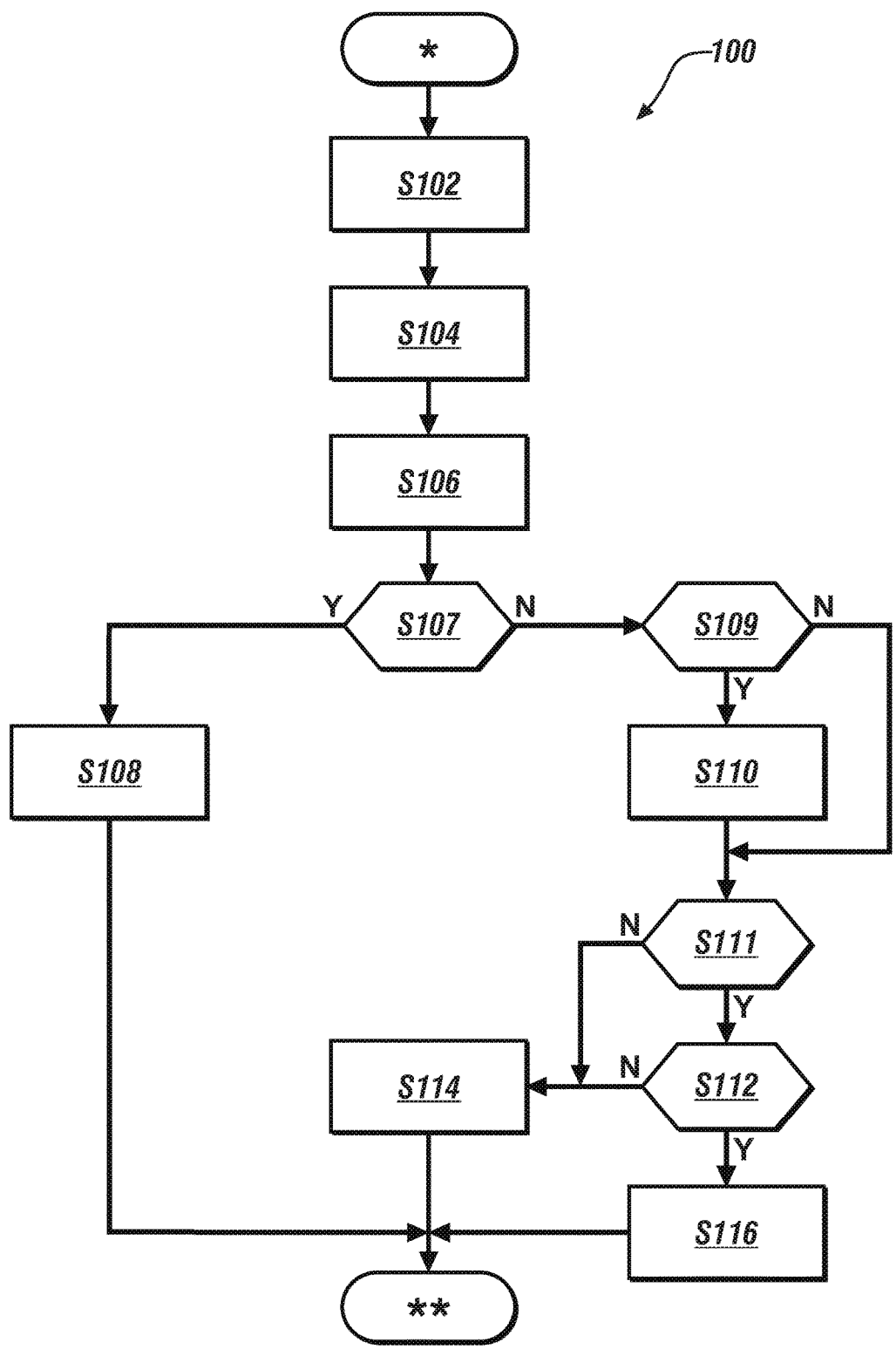
FIG. 3 is a flow chart describing a hybrid sensor/sensorless control method according to a possible embodiment.

The controller 50, although schematically depicted as a single controller, may be variously implemented as one or more control devices collectively managing the example electric starter system 12 according to a method 100, an example embodiment of which is depicted in FIG. 3. Multiple controllers may be in communication via a serial bus, e.g., a Controller Area Network (CAN), or via discrete conductors. The controller 50 may include one or more digital computers each having a processor (P), e.g., a microprocessor or central processing unit, as well as memory (M) in the form of read only memory, random access memory, electrically-programmable read only memory, etc., a high-speed clock, analog-to-digital and digital-to-analog circuitry, input/output circuitry and devices, and appropriate signal conditioning and buffering circuitry. The controller 50 may also store algorithms and/or computer executable instructions in memory (M), including the sensorless logic 55 described below, and transmit commands to the electric starter system 12 to enable performance of control actions according to the present disclosure.

The controller 50 is in communication with the engine 20 and receives, as part of the input signals (arrow CO, signals indicative of a speed and temperature of the engine 20, as well as other possible engine operating conditions or parameters. Such parameters include a starting request of the engine 20, whether operator-initiated or autonomously generated. The controller 50 is also in communication with the starter motor 18, and thus receives signals indicative of current speed, current draw, torque, temperature, and/or other operating parameters. The controller 50 may also communicate with the battery pack 14 and receive signals indicative of a battery state of charge, temperature, and current draw, as well as a voltage across the respective DC and AC voltage buses 15 and 17. The controller 50 of FIG. 1 is configured to use the input signals (arrow CO, including the measured position signals from the position sensor(s) 36, during startup of the engine 20 and up to a low threshold speed of the starter motor 18, with the terms "low threshold speed" and "low speed" as used herein meaning less than about 1000 RPM, i.e., ±10%, or less than 1500 RPM in another embodiment.

Figure 2:
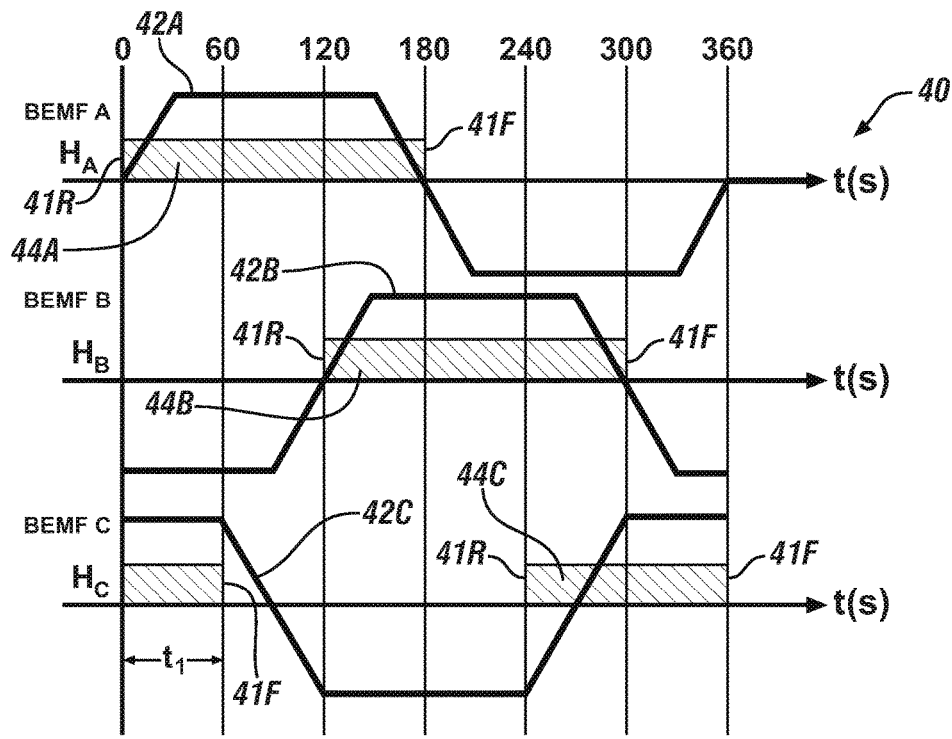
FIG. 2 is a time plot of example sensor-based angular position signals usable by the controller of FIG. 1 during a low-speed portion of an operating range of the starter motor, with time depicted and rotor position depicted on the horizontal axis and BEMF for each of three example electrical phases depicted on the vertical axis.

Referring to FIG. 2, respective rising and falling edges 41R and 41F of the measured angular position signals from position sensor(s) 36 of FIG. 1, embodied as example Hall-effect sensors of the type described above, are used by the controller 50 to estimate the current angular position of the rotor 19, and thus to calculate the current rotational speed of the rotor 19. Once the rotor 19 is rotating above the calibrated threshold speed, the controller 50 transitions to control of the starter motor 18 solely using the sensorless logic 55. Between zero speed and the threshold speed, the controller 50 also uses the measured position data from the position sensor(s) 36 to calibrate the sensorless logic 55 and ensure proper convergence of the estimated angular position/speed with the measured angular position/speed from the position sensor(s) 36.

Various embodiments of the sensorless logic 55 may be used within the scope of the present disclosure. Example approaches include, but are not limited to, a BEMF-based methodology, inductance-based methodology, and high-speed signal injection. BEMF is directly proportional to rotor speed, with BEMF increasing and resisting motion as the electric machine picks up speed. Thus, once the rotor 19 begins rotating, it is possible to estimate speed and position by monitoring BEMF. Signal injection, as the name indicates, injects a high-frequency carrier signal into the control voltage to the electric machine, and observes the frequency response in estimating speed and position. Inductance-based estimation determines inductance for each voltage phase and, from this data, estimates position and speed, e.g., by monitoring a change in phase current during each injected signal pulse. These and other sensorless approaches will be appreciated by those of ordinary skill in the art.

A time plot 40 is shown in FIG. 2 for example sensor-based position signals usable by the controller 50 of FIG. 1 during the low-speed portion of an operating range of the starter motor 18, with time in seconds, t(s), depicted on the horizontal axis along with angular position ($\theta_r$) of the rotor 19, and BEMF for each of three example electrical phases (BEMF A, BEMF B, BEMF C) depicted on the vertical axis. As shown, traces $H_A$, $H_B$, and $H_C$ correspond to three phases from an example Hall-effect sensor embodiment of the position sensor(s) 36 shown in FIG. 1. Thus, FIG. 2 depicts Hall-effect sensor signal correlation to the measured rotor angle. Other low-cost sensor types would produce a type-specific trace, and therefore the traces $H_A$, $H_B$, and $H_C$ are intended as illustrative of the disclosed concepts.

For each electrical phase, each position sensor 36 of FIG. 1 has a corresponding output signal 44A, 44B, and 44C, i.e., traces $H_A$, $H_B$, and $H_C$, with corresponding rising and falling edge associated with a given fixed angular position or rotor angle ($\theta_r$) of the rotor 19 or other rotatable portion of the starter motor 18. For instance, for trace $H_A$ the rising edge 41R corresponds to 0° on a BEMF trace 42A, and the falling edge 41F corresponds to 180° on a BEMF trace 42A. Likewise, the rising edges 41R of traces $H_B$ and $H_C$ correspond to 120° and 240°, respectively, and the falling edges 41F of traces $H_B$ and $H_C$ respectively correspond to 300° and 60°.

The angle difference between two consecutive signal edges is thus used by the controller 50 to estimate a rotor speed $\omega_r$ of the rotor 19 at or below a calibrated low speed of the starter motor 18 of FIG. 1 as follows:

$$\omega_r = K \cdot \frac{\pi}{3t_1}$$

where $t_1$ is the time period between two closest edges, here the rising edge 41R of trace $H_A$ and the falling edge 41F of trace $H_C$. The variable K is a constant used to convert rotor speed. For instance, if rotor speed is angular velocity, K=1. If rotor speed is stated in RPM, then $$K = \frac{2\pi}{60}.$$

An example method 100 is depicted in FIG. 3 providing hybrid sensor/sensorless control of a starting operation of the engine 20 within the powertrain 10 of FIG. 1. As part of the present control strategy, the controller 50 measures the angular position ($\theta_r$) of the rotor 19 upon detection of every rising or falling edge of traces $H_A$, $H_B$, and $H_C$. That is, from the detected signal edges 41R and 41F the controller 50 is able to calculate the angular position (Or) of the rotor 19 as follows:

$$\theta_r = \omega_r t + k1 \frac{\omega_{r1} - \omega_{r2}}{t_1} t$$

where $\omega_{r1}$ and $\omega_{r2}$ are the rotational speeds at two Hall-effect or other position signal edges defining the time interval $t_1$, and k1 is a constant calibration value in the form of a coefficient of a second order equation. At every signal edge 41R and 41F, therefore, the controller 50 resets the angular position ($\theta_r$) to a real predetermined value.

As noted above, the controller 50 executes the method 100 in the overall torque control of the starter motor 18. In general, the controller 50 is configured to control operation of the starter motor 18 below a calibrated low threshold speed, e.g., about 1000 RPM or about 1500 RPM in different embodiments, using measured angular position signals from the position sensor(s) 36. Below such a threshold speed, the controller 50 uses the measured angular position signals to calibrate the sensorless logic 55. Above the threshold speed, the controller 50 determines the position and speed of the starter motor 18 using the sensorless logic 55 alone.

FIG. 3 depicts an example embodiment of the method 100 for hybrid sensor/sensorless control within the powertrain 10 of FIG. 1. After initialization (*) of the controller 50, when the starter motor 18 has zero speed, the method 100 proceeds to step S102 where the controller 50 receives raw angular position signals as measured by the position sensor(s) 36. Other control signals may be received at step S102, including for instance current and voltage signals describing a level of power feed to the starter motor 18. The method 100 then proceeds to step S104.

At step S104, the controller 50 uses the received angular position signals from the position sensor(s) 36 of FIG. 1, i.e., measured signals, to determine the angular position/rotor position $\theta_r$ and associated rotor speed $\omega_r$ of the rotor 19 as set forth above with reference to FIG. 2. The method 100 then proceeds to step S106.

Step S106 entails estimating the rotor speed $\omega_r$ and angular position $\theta_r$ using the sensorless logic 55 shown schematically in FIG. 1. As noted above with reference to FIG. 2, various embodiments of the sensorless logic 55 may be used within the scope of the present disclosure, e.g., a BEMF-based methodology, an inductance-based methodology, or a high-speed signal injection methodology in a few example embodiments. The method 100 proceeds to step S107 once the rotor speed $\omega_r$ and angular position $\theta_r$ have been estimated using the sensorless logic 55.

Step S107 includes determining, via the controller 50, whether or not to enable sensorless control of the starter motor 18, i.e., to transition away from use of real-time measurement of the angular position via the position sensors 36 to real-time estimation of the angular position using the sensorless logic 55. Step S107 may entail comparing the speed of the rotor 19 to the calibrated threshold speed. Step S108 is executed when the rotational speed $\omega_r$ of the rotor 19 exceeds the calibrated threshold speed. Below the calibrated threshold speed, the controller 50 instead executes step S109.

At step S108, the controller 50 uses the estimated values from step S106 to control torque output from the starter motor 18 to the engine 20. Typically, this entails delivering the motor torque (arrow $T_M$ of FIG. 1) to the engine 20 via the flywheel 32 by operation of the solenoid 21, as part of an auto-start function. However, other operating modes may be envisioned in which motor torque (arrow $T_M$ of FIG. 1) is delivered to the engine 20 while the engine 20 is running. The method 100 is then complete (**), starting anew with step S102.

At step S109, the controller 50 continues to control operation of the starter motor 18 using the measured angular position signals from the position sensor(s) 36 of FIG. 1. The controller 50 determines whether a new or updated position signals have been received. If so, the controller 50 executes step S110. Otherwise, the controller 50 proceeds to step S111.

Step S110 includes calibrating the estimated rotor speed, West, and the estimated rotor position, $\theta_{est}$, using the position signals from the sensors 36. For instance, the controller 50 may compare the position signals from the sensors 36 to the estimated values from the sensorless logic 55 and force the estimated values to converge with the measured values, e.g., in a closed-loop approach in which variance from the measured values is treated as error. The method 100 then proceeds to step S111.

At step S111, the controller 50 determines whether the rotor speed, $\omega_r$, as determined at step S104 exceeds a calibrated threshold. The method 100 proceeds to step S112 when the rotor speed ($\omega_r$) exceeds the calibrated threshold speed. Step S114 is executed in the alternative when the rotor speed ($\omega_r$) is less than the calibrated threshold speed.

At step S112, the controller 50 determines if the estimated rotor position, $\theta_{est}$, has converged. The method 100 proceeds to step S116 when convergence is detected. The method 100 proceeds in the alternative to step S114 when convergence has not occurred.

Step S114 includes using the measured rotor position and speed, i.e., $\omega_r$ and $\theta_r$, respectively, in the control of the starter motor 18. The method 100 is finished (**) with step S114, commencing anew at step S102.

Step S116 includes enabling sensorless control of the starter motor 18. In other words, the controller 50 discontinues using real-time measured position and speed data from the positions sensor(s) 36 of FIG. 1. Instead, the controller 50 uses the sensorless logic 55 alone at speeds of the rotor 19 exceeding the above-noted threshold speed. In this manner, the controller 50 is able to achieve improved power performance and flux weakening control of the starter motor 18. Additionally, the added cost of relatively expensive absolute position sensors is eliminated.

While some of the best modes and other embodiments have been described in detail, various alternative designs and embodiments exist for practicing the present teachings defined in the appended claims. Those skilled in the art will recognize that modifications may be made to the disclosed embodiments without departing from the scope of the present disclosure. Moreover, the present concepts expressly include combinations and sub-combinations of the described elements and features. The detailed description and the drawings are supportive and descriptive of the present teachings, with the scope of the present teachings defined solely by the claims.

What is claimed:

1. An electric starter system for use with an internal combustion engine and an alternating current (AC) voltage bus, the electric starter system comprising:
   a brushless starter motor electrically connected to the AC voltage bus and selectively connectable to the engine in response to a requested engine start event, the brushless starter motor having a rotor with a rotor position;
   a position sensor positioned with respect to the rotor that is configured to generate measured position signals indicative of the rotor position; and
   a controller in communication with the position sensor and programmed with sensorless logic configured to generate an estimated rotor position;
   wherein the controller is configured, below a threshold speed of the brushless starter motor, to:
      calibrate the sensorless logic using the measured position signals; and control a torque operation of the starter motor during the requested engine start event using the measured position signals; and wherein the controller is configured to control the torque operation of the brushless starter motor above the threshold speed solely using the estimated rotor position.

2. The electric starter system of claim 1, wherein the measured position signals form a pulse train having rising and falling edges, and the controller is configured to determine the angular position of the rotor by detecting the rising and falling edges of the pulse train and using a time between the rising and falling edges.

3. The electric starter system of claim 2, wherein the position sensor includes a Hall-effect sensor.

4. The electric starter system of claim 2, wherein the position sensor includes an inductive sensor.

5. The electric starter system of claim 2, wherein the position sensor includes a reluctance sensor.

6. The electric starter system of claim 1, wherein the sensorless logic includes a back-electromotive force (BEMF) estimation technique.

7. The electric starter system of claim 1, wherein the sensorless logic is an inductance-based estimation technique.

8. The electric starter system of claim 1, wherein the sensorless logic is a high-frequency signal injection-based estimation technique.

9. A hybrid sensor/sensorless control method for use with a system having an alternating current (AC) brushless starter motor selectively connectable to an internal combustion engine, the brushless starter motor having a rotor with a rotor position, a position sensor positioned with respect to the rotor, and a controller in communication with the position sensor, the method comprising:

below a threshold speed of the starter motor:
generating measured angular position signals using the position sensor, the measured angular position signals being indicative of the rotor position of the brushless starter motor;
calibrating sensorless logic of the controller using the measured angular position signals; and
controlling a torque operation the brushless starter motor below the threshold speed using the measured angular position signals; and above the threshold speed:
generating an estimated rotor position using the sensorless logic; and
controlling the torque operation of the brushless starter motor solely using the estimated rotor position.

10. The method of claim 9, wherein the measured angular position signals form a pulse train having rising and falling edges, the method further comprising:
detecting the rising and falling edges via the controller; and
determining the position and a speed of the rotor using a time between the rising and falling edges.

11. The method of claim 9, wherein the position sensor includes a Hall-effect sensor.

12. The method of claim 9, wherein the position sensor includes an inductive sensor.

13. The method of claim 9, wherein the position sensor includes a reluctance sensor.

14. The method of claim 9, wherein generating an estimated rotor position using the sensorless logic includes using a back-electromotive force (BEMF) estimation technique.

15. The method of claim 9, wherein generating an estimated rotor position using the sensorless logic includes using an inductance-based estimation technique.

16. The method of claim 9, wherein generating an estimated rotor position using the sensorless logic includes using a high-frequency signal injection-based estimation technique.

17. The method of claim 9, further including a transmission coupled to the engine, a drive axle coupled to the transmission, and a load coupled to the drive axle, the method further comprising:
transmitting torque from the engine to the load via the transmission and the drive axle.

18. The method of claim 17, wherein transmitting torque from the engine to the load includes transmitting the torque to a set of drive wheels of a motor vehicle.

19. A powertrain comprising:
an internal combustion engine;
a transmission connected to the engine;
a drive axle connected to the transmission;
a load connected to the drive axle; and
an electric starter system comprising:
a brushless starter motor electrically connected to an alternating current (AC) voltage bus, the brushless starter motor being selectively connectable to the engine in response to a requested engine start event, the brushless starter motor having a rotor with a rotor position;
a position sensor positioned with respect to the rotor that is configured to generate measured position signals indicative of the rotor position; and
a controller in communication with the position sensor and programmed with sensorless logic configured to generate an estimated rotor position;
wherein the controller is configured, below a threshold speed of the brushless starter motor, to:
calibrate the sensorless logic using the measured position signals; and
control a torque operation of the brushless starter motor during the requested engine start event using the measured position signals; and wherein the controller is configured to control the torque operation of the brushless starter motor above the threshold speed solely using the estimated rotor position.

20. The powertrain of claim 19, wherein the powertrain is part of a motor vehicle, and wherein the load is a set of road wheels of the motor vehicle.

* * * * *